Figure 1:
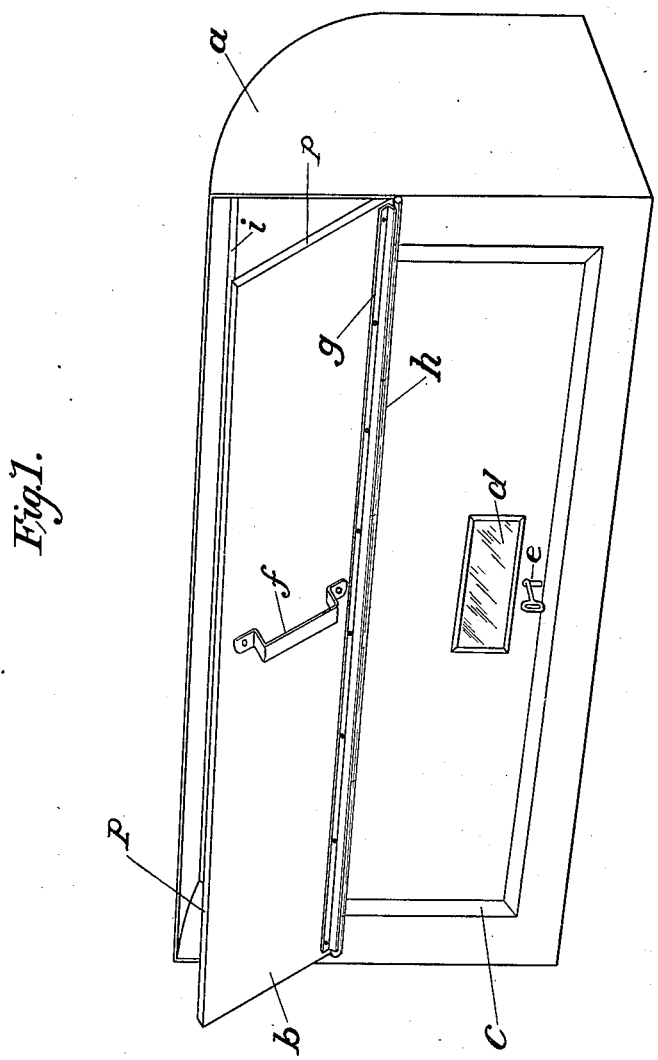

C. A. H. OTTO.
BREAD RECEPTACLE.
APPLICATION FILED APR. 3, 1913.

1,086,206.

Patented Feb. 3, 1914.
2 SHEETS—SHEET 1.

WITNESSES
E. J. Sheely
Frank S. Sheely

C. A. H. Otto, INVENTOR

BY
James J. Sheely & Co., ATTORNEYS

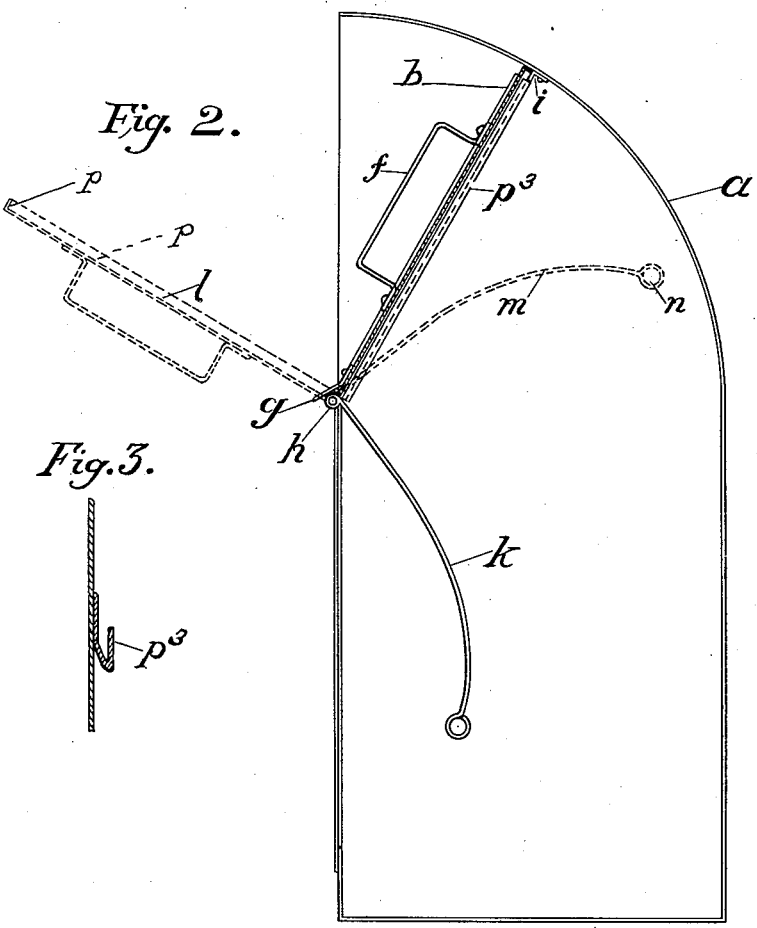

UNITED STATES PATENT OFFICE.

CHRISTOPHER A. H. OTTO, OF NEW ORLEANS, LOUISIANA.

BREAD-RECEPTACLE.

1,086,206.

Specification of Letters Patent.

Patented Feb. 3, 1914.

Application filed April 3, 1913. Serial No. 758,669.

*To all whom it may concern:*

Be it known that I, CHRISTOPHER A. H. OTTO, citizen of the United States, residing at New Orleans, in the parish of Orleans and State of Louisiana, have invented new and useful Improvements in Bread-Receptacles, of which the following is a specification.

My present invention pertains to bread receptacles; and it contemplates the provision of a receptacle in which bread can be expeditiously and easily placed in such a manner that it can only be removed by an authorized person through a door way provided for the purpose.

The receptacle is adapted to contain the bread and exclude moisture, dust, etc., from the same, and it will be fully understood from the following description and claim when the same are read in connection with the drawings, accompanying and forming part of this specification, in which:

Figure 1 is a perspective of the receptacle constituting the preferred embodiment of my invention; the same being shown with the closure partly open. Fig. 2 is a view showing the receptacle as it would appear with one of the side walls of the body removed; the door being shown by full lines in section. Fig. 3 is a detail section hereinafter specifically referred to.

Referring by letter to the said drawings: $a$ is the body of the receptacle. The said body is provided with a door $c$, bearing a sight glass $d$ and equipped with a lock $e$ so that it can only be opened by an authorized person provided with a key.

Between the upper edge of the front wall of body $a$ and the top wall thereof is afforded an opening through which bread can be deposited in the body in the early morning hours. The said opening extends the full length of the body, and above the same and connected to the overhanging portion of the body is a stop $i$, Figs. 1 and 2.

For the purpose of normally closing the opening I provide the swinging door $b$. The said door is hinged at $h$ to the body, and is provided with a handle $f$, and also with flanges $p$, the purpose of which latter will be hereinafter set forth.

In order to prevent rain getting into the box, I provide the guard $g$ connected to the outer side of the door $b$ and arranged to overhang the hinge and form a water shed at all times, as best shown in Fig. 2.

Fixed with respect to the hinged portion of the door $b$ is an auxiliary door $k$ which extends within the body $a$ and is designed to prevent the removal of bread from the box through the opening controlled by the door $b$.

When the door $b$ is in the position shown by full lines in Fig. 2, it will be manifest that the receptacle will be tightly closed in such manner as to exclude moisture and dust. When, however, the door $b$ is opened to the dotted line position indicated by $l$ in Fig. 2, one or more loaves of bread can be readily placed on the auxiliary door $k$ which is then in the dotted line position indicated by $m$ and $n$ in Fig. 2. Subsequently to the described placing of the loaf or loaves of bread on the auxiliary door, the door $b$ is swung to its closed position against the stop $i$, whereupon the loaf or loaves of bread will be precipitated from the auxiliary door $k$ into the receptacle. It will also be noticed in this connection that if the door $b$ be opened after the described placing of bread in the body $a$, the auxiliary door $k$ will assume such a position, see dotted lines in Fig. 2, as to preclude the removal of the bread through the opening controlled by the door $b$.

In the practical use of the receptacle, it is contemplated to secure the same in some suitable manner to a dwelling, store or other building to which bread is to be delivered, and by reason of the construction of the receptacle, it will be appreciated that bread delivered in the early morning hours will be preserved in wholesome state and against theft until it is removed from the receptacle by an authorized person through the opening controlled by the door $c$.

As will be understood by comparison of Figs. 2 and 3, the receptacle body $a$ is provided on the inner sides of its side walls with downwardly and forwardly inclined channel-flanges $p^3$ which extend to points over and adjacent the hinged connection of the door $b$; thus affording means for the removal of dust and the escape of rain water, preventing the same from falling into the body where the bread is deposited.

When the door $b$ is closed, the top flange $p$ thereof brings up against the stop strip $i$, and the side flanges $p$ of the door seat in the channel-flanges $p^3$, and hence, as will be manifest there is no liability of water or dust finding its way into the body.

Having described my invention, what I claim and desire to secure by Letters-Patent, is:

The herein described receptacle, comprising a body having an opening in the upper portion of its front wall, and a curved top, and also having an interior transverse stop carried by the curved top at a point in rear of said opening, a door hinged to the body, immediately below the opening, and adapted when closed to rest against the stop and in downwardly and forwardly inclined position; said door having side flanges, a guard fixed to the door and overhanging the hinged connection to form a watershed, an auxiliary door disposed within the body and fixed to and extending inwardly from the hinged portion of the door, and channel-flanges fixed to the side walls of the body and extending in inclined position downwardly and outwardly from the stop to the hinged connection of the door, substantially as described and for the purpose set forth.

In testimony whereof I have hereunto set my hand in presence of two subscribing witnesses.

CHRISTOPHER A. H. OTTO.

Witnesses:
JOHN L. FELIU,
E. C. KELLY.

Copies of this patent may be obtained for five cents each, by addressing the "Commissioner of Patents, Washington, D. C."